United States Patent [19]

Reineccius et al.

[11] 4,152,003
[45] May 1, 1979

[54] GOLF EQUIPMENT

[76] Inventors: Robert D. Reineccius, 3687 Sutton Loop, Fremont, Calif. 94536; Michael E. Pope, 3814 Carol Ave., Fremont, Calif. 94538

[21] Appl. No.: 852,232

[22] Filed: Nov. 17, 1977

Related U.S. Application Data

[63] Continuation-in-part of Ser. No. 661,390, Mar. 15, 1976, abandoned.

[51] Int. Cl.² ............................................. B62B 1/04
[52] U.S. Cl. ..................................... 280/47.18; 248/96
[58] Field of Search ..................... 280/47.18, DIG. 6; 248/96

[56] References Cited

U.S. PATENT DOCUMENTS

| | | | |
|---|---|---|---|
| 1,926,184 | 9/1933 | Schwer | 280/DIG. 6 |
| 2,570,504 | 9/1951 | Van House | 280/DIG. 6 |
| 2,817,538 | 12/1957 | Romang | 280/47.26 |

Primary Examiner—Joseph F. Peters, Jr.
Assistant Examiner—R. Schrecengost

[57] ABSTRACT

A golf cart which can be attached to a golf bag to provide for a quick and easy conversion to a hand cart or a carry bag with a bag stand that can be stowed aboard a powered golf cart. The golf cart requires minimum storage and is easy to assemble and can be quickly disassembled.

1 Claim, 8 Drawing Figures

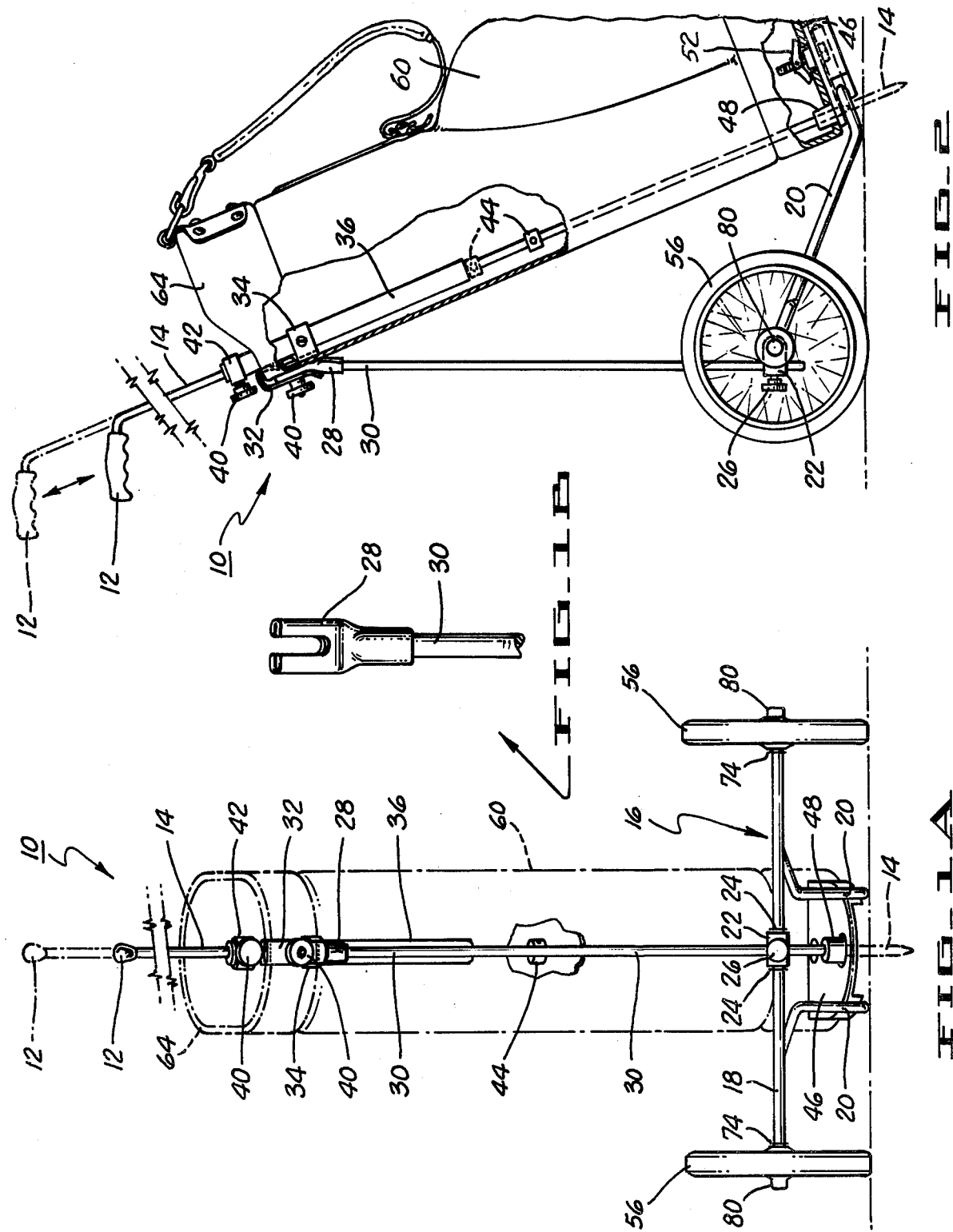

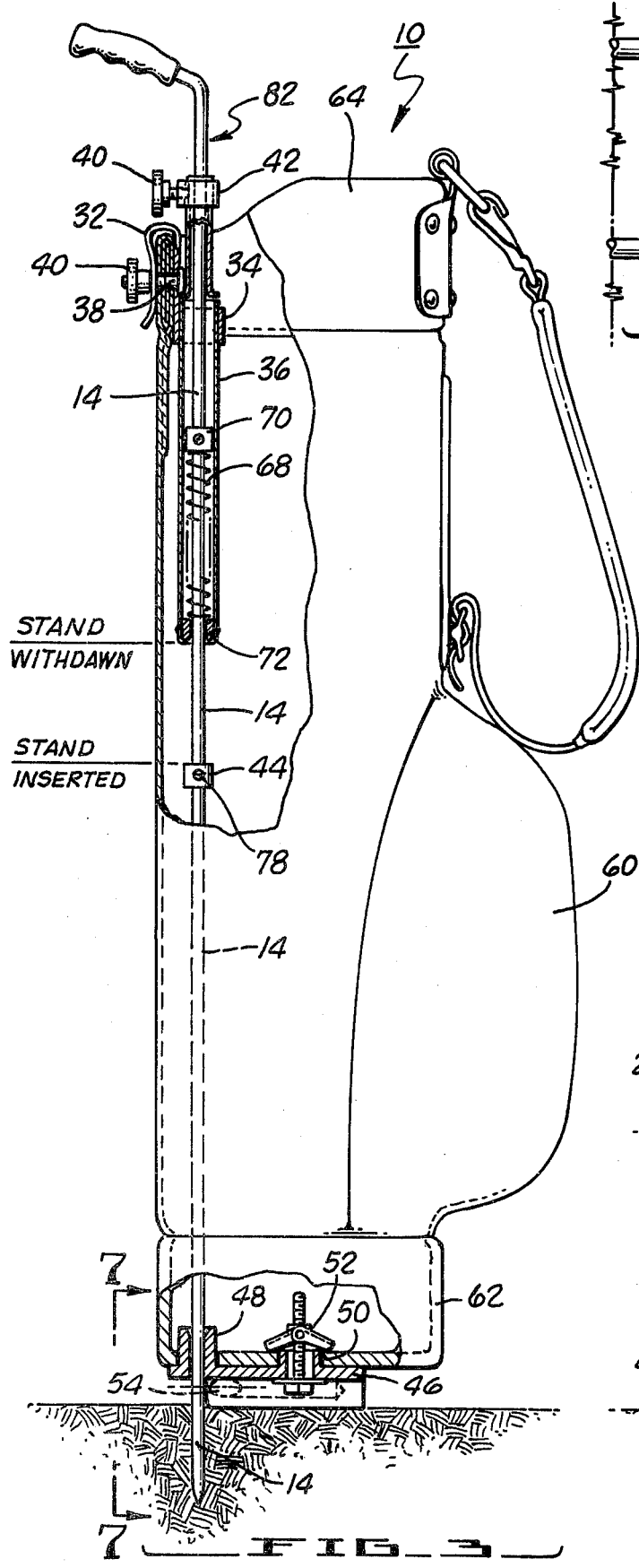
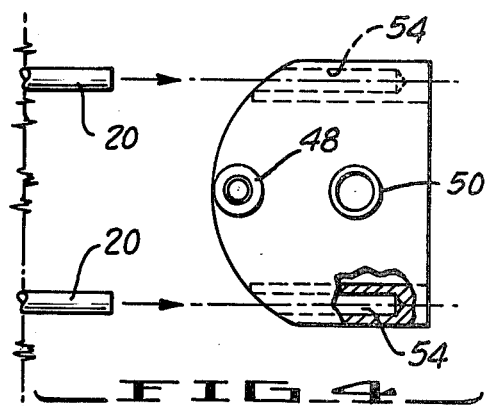
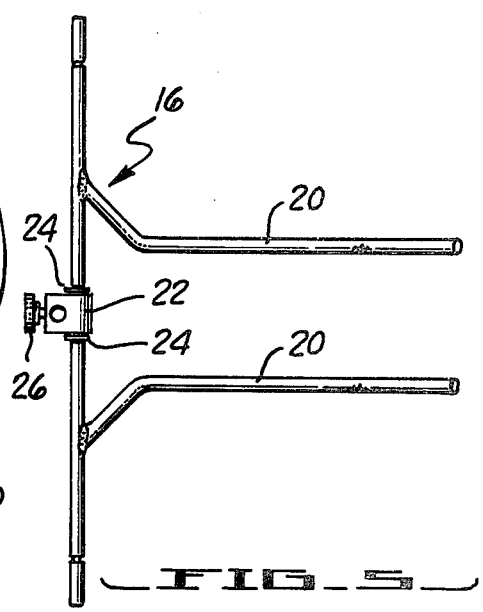
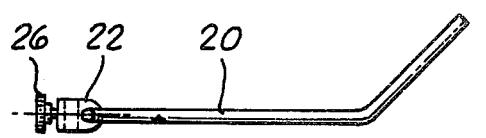
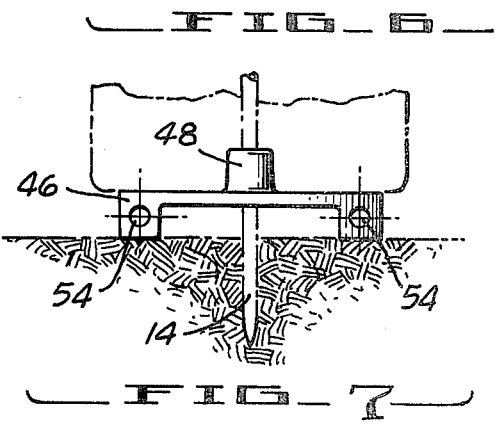

GOLF EQUIPMENT

This is a continuation-in-part of application Ser. No. 661,390 filed Mar. 15, 1976 and now abandoned.

BACKGROUND OF THE INVENTION

This invention relates to a combination of devices to either support a hand-carried golf bag in an upright position while it is at rest, or to convert it to a hand-pulled golf cart which stands by itself in a nearly upright position while at rest.

Many attempts have been made in the past to provide a golf bag support. The following United States patents are directed to this: U.S. Pat. Nos. 3,666,221; 3,435,866; 3,191,900; 3,075,783; 2,453,565; 1,926,184; 1,488,389; 1,452,084; 1,444,357; and 1,291,359. Also numerous attempts have been made to provide a satisfactory hand-pulled, easily storable, golf cart. The following United States patents are directed to this: U.S. Pat. Nos. 3,735,997; 3,708,004; 3,479,052; 3,471,162; 3,096,992; 3,079,166; 2,992,012; 2,989,319; 2,890,061;2,817,538 and 2,786,693. Of the above 2,817,538 is a cart and stand but does not have a detachable wheel carriage. There is, however, a need for something which embodies the features necessary to allow easy conversion from a golf bag with a support to a hand-pulled cart and which is, at the same time, quick and easy to convert, light in weight, economically feasible, which requires a minimum of stowage space, and which is readily compatible with the main function of a golf bag and does not interfere with, or to a very minimal degree, the other elements of that function, which is to contain golf clubs, golf balls, and other related equipment used in the game.

In a broad aspect the present invention relates to apparatus to be used with a golf bag. It includes a hollow tubular member through which a rod, pointed on one end and forming a handle on the other end, is inserted. The tubular member is placed parallel to the longitudinal axis of the bag and is attached to the upper end of the bag. The rod is longer than the bag and is sharpened at one end to facilitate insertion into the ground to support the bag in an upright position, while the other end of the rod is formed to become a handle which has the dual purpose of providing a means for inserting the rod into the ground and, when the wheel carriage is attached, is used as a handle for towing the cart.

The particular objective of this invention is to provide for versatility in golf equipment at low cost which is light in weight and which requires minimum storage space. Other objectives will become apparent from the detailed description and accompanying drawing which is part of this specification.

BRIEF DESCRIPTION OF THE DRAWINGS

FIG. 1A is a front elevational view of a golf cart, frame, wheels, bag and bag support as embodied in the present invention, the golf bag being shown in phantom lines for clarity.

FIG. 1B is a fragmentary front elevational view of a vertical support rod having a flanged portion at the topmost end to act as a means of attaching said support rod to a mounting device forming part of the frame system.

FIG. 2 is a side elevational view of FIG. 1, the bag being shown in full lines with parts being broken away for clarity of certain elements of the invention.

FIG. 3 is an enlarged side elevational view of a golf bag with portions of the present invention attached, showing the bag with parts broken away for clarity to reveal details of those elements of the invention related to free-standing bag features as used without the wheel carriage shown in FIG. 1.

FIG. 4 is a plan view of the base plate which is mounted to the bag bottom surface and shows the relationship of the base plate mounting socket holes with support rod members of the wheel carriage which are received by the mounting socket holes.

FIG. 5 is a plan view of the wheel carriage support frame complete with upper support rod (FIG. 1.B) center adapter and securing knob.

FIG. 6 is a side elevational view of FIG. 5 which shows the geometry of wheel carriage support frame.

FIG. 7 is a partial front elevational view taken at lines 7—7 of FIG. 3 showing the wheel carriage support frame mounting sockets, the base, the boss which is the guide for the bag stand support and handle, and other related elements.

DESCRIPTION OF THE PREFERRED EMBODIMENTS

Referring now to the drawing and to FIGS. 1 and 2 in particular the entire unit 10 is shown attached to a golf bag 60. The handle 12 is attached to bag stand rod 14 and is shown in lower position with the bag stand rod 14 inserted into the ground. The handle 12 is also phantomed in to the uppermost position which is normal when used as a hand-pulled cart. It can be secured in this position by tightening positioning knob 40 which clamps support rod limit clamp 42 onto bag stand rod 14 which in turn butts against bias tube 36 to prevent downward movement. It is prevented from further extension by support rod stop collar 44, which is in a fixed position on 14 by set screw 78, and butts against the bottom of bias tube 36. The bag stand rod 14 is guided at the lower end by boss 48 which is part of base plate 46. Referring now to FIG. 3, the bag stand rod 14 is held in a normal upward position by bias spring 68 which acts against lower bias tube collar 72 and upper bias tube collar 70 which is secured to bag stand rod 14 by set screw 76. Base plate 46 is semi-permanently attached to bottom of golf bag 62 by insertion of bosses 48 and 50 into prepared holes in the bottom of bag and is attached by a blind type of fastener 52 (such as a toggle bolt or similar device). Bosses 50 and 48 prevent base plate 46 from rotating on the base of the bag 60. Said base plate 46 contains two holes 54 which act as sockets for support extensions 20 of wheel carriage frame 16 (see FIGS. 5 & 6).

The wheel carriage 16 (FIGS. 5 & 6) consists of two support rod extensions 20, an axle 18, attachment adapter 22, two wheels 56 and suitable devices such as retainer rings 24 for retaining attachment adapter 22 in a central position, retainer rings 74 to retain wheels in outer position, suitable nuts 80 to retain wheels on axle 18, a vertical support rod 30 which contains an adapter 28 which attaches to upper end of the golf bag 60 by a knob 40 which screws onto attachment bolt 38. The vertical support rod 30 has an adjustable feature at its' lower end where it connects with attachment adapter 22 and is retained in the desired position by adjustment knob 26.

The bias tube 36 is attached to the top portion of a golf bag 64 by top attachment adapter 32 which is connected to bias tube 36 by a bias tube attachment collar 34 or by welding or other suitable means.

The base 46, wheel carriage elements 18, 20 and 22, support rods 14 and 30, bias tube 36, handle 12, all limiting clamps and collars including 40, 42, 44, 72 may be made of any suitable materials such as plastic or metals. Retainers such as 24 and 74 and wheel fasteners 80 are optional in that many suitable devices can be procured.

We claim:

1. Apparatus adapted to be detachably mounted to a golf bag having a lower end, a hollow tubular body, and an open upper end for receiving a set of golf clubs, said apparatur comprising:

a base adapted to be mounted to said bag, said base including detachable mounting means for rigidly mounting said base to the lower end of the bag:

handle means, adapted to be mounted within said golf bag for either transporting said golf bag over the ground or for insertion into the ground, including an upper end to be manually grasped and manipulated, a mid-portion slidably mounted within said golf bag, and a lower end slidably mounted within said base and insertable into the ground, said handle means further including retaining means mounted within said hollow tubular body and slidably retaining said mid-portion of the handle means for movement along the bag, whereby the handle means may either be pulled for transporting the bag over the ground or pushed for slidably moving said mid-portion and inserting said lower portion into the ground;

wheel means for transporting said bag over the ground, said wheel means including an axle, a wheel rotably mounted to each end of the axle, upper strut means attached to a mid-portion of said axle means and detachably mounted to said retaining means, and lower strut means attached to a mid-portion of said axle means and detachably mounted to said base.

* * * * *